April 7, 1964     E. NITENSON     3,127,948

CLOTHES WASHER SCALE

Filed June 14, 1961

INVENTOR.
Edward Nitenson
BY
Ezekiel Wolf, Wolf & Greenfield
ATTORNEYS 3,127,948
CLOTHES WASHER SCALE
Edward Nitenson, 3 Lyndon Road, Sharon, Mass.
Filed June 14, 1961, Ser. No. 117,037
4 Claims. (Cl. 177—144)

This invention relates to washing machines and more particularly comprises a top loading washing machine having a scale incorporated into the cover of the machine.

For the convenience of their owners, better front loading washing machines include as standard equipment a scale upon which the articles to be washed can be weighed. As all washing machines have a very definite limit on the weight of a single load that may be washed, scales provided as part of the machine enable the owners to avoid overloading the machine, and thus prolong the machine life. Heretofore, no top loading machine of which I am aware has included as an integral part thereof a scale to weigh the articles to be washed before they are loaded into the machine.

The primary object of my invention is to provide a convenient means for incorporating a scale into a top loading washing machine.

Another important object of my invention is to provide a cover for a top loading machine which performs the dual function of a lid for the drum opening and a scale for the weighing of articles to be washed.

Yet another important object of my invention is to provide a lid or cover for top loading machines which may be adapted for any variety or make of machine and which includes as an integral and substantially self-contained part a scale for weighing the load for washing.

To accomplish these and other objects, my invention includes among its important features a cover made up of spaced top and bottom plates oriented in substantially parallel planes and which telescopically fit together. The cover so formed comprises a scale or weighing device with the bottom or lower plate serving as the base and the upper or top plate serving as the load supporting surface. A spring is disposed between the two plates and serves to support the upper plate a selected distance above the lower plate when no load is applied to the upper plate. A signaling device such as a bell or light may be mounted on the control panel of the washer and may be connected to a switch disposed on the bottom plate of the cover by leads through or about the hinge that secures the cover to the body. An actuating finger secured to the upper plate is aligned with the blade of the switching device and is adapted to actuate the switching device when the lower plate is moved against the bias of the spring a selected distance toward the lower plate. The switch and finger are so oriented that the indicator is not energized unless more than the maximum allowable load of the washer is placed on the cover plate. As a result, unless the indicator is energized, the operator knows that the articles to be washed placed on the cover do not exceed the limit of the machine.

The cover also includes a device for indicating the actual weight of the load whether or not that load exceeds the recommended limit of the machine. Such an indicator is particularly desirable as the maximum load of the machine varies with the size of articles to be washed. For relatively small articles such as clothing the machine may have a capacity of nine pounds, and for larger items such as sheets, it may be limited to six pounds.

As yet another feature, my invention includes a wicker type basket which is incorporated into the cover. The side walls of the basket may be made of wire and be collapsible on the surface of the cover so that when the scale is not in use it may be folded out of the way. However, to support a load of clothing to be weighed within the confines of the cover, the sides may be raised to form with the top plate a basket for containing all of the article to be weighed.

These and other objects and features of my invention will be better understood and appreciated from the following detailed description of one embodiment thereof selected for the purposes of illustration and shown in the accompanying drawing, in which.

Figure 1:
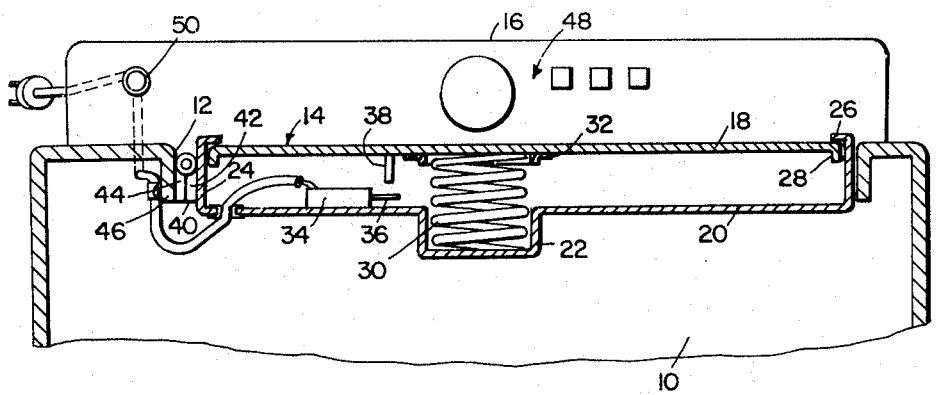
FIG. 1 is a cross sectional elevational view of a washing machine embodying a cover constructed in accordance with my invention.

The washing machine shown in the drawing includes a body 10 having an opening 12 at its top through which articles to be washed are introduced into the machine, a lid or cover 14 which closes the opening, and a control panel 16.

The cover 12 includes upper and lower parallel plates 18 and 20 that serve as the weighing platform and base respectively, of a scale. The lower plate 20 is provided with a well 22 at its center and with an upwardly extending flange 24 above its periphery. The upwardly extending flange 24 is folded inwardly at the top 26 to retain the upper plate 18 in place with respect to the lower plate. The plate 18 includes a downwardly turned peripheral flange 28 which cooperates with the upwardly extending flange 24 of the bottom plate to guide the relative movement of the two plates and preserve their parallel relationship.

A coil spring 30 is seated in the well 22 and bears against the lower surface of the plate 18 within a confined area defined by collar 32. The spring 30 urges the plate 18 to a raised or elevated position within the confines of the upwardly extending flange 24 and is calibrated to yield a prescribed amount in accordance with each unit weight of load applied to the plate or platform 18.

Mounted on the lower plate 20 of the cover 14 is a switching device 34 which may be a microswitch with blade 36, or some other form of circuit making and breaking device. The blade 36 is aligned with the finger 38 carried on the weighing platform or plate 18 so that when the plate 18 moves downwardly a selected distance toward plate 20, the finger 38 actuates the blade 36 of the switch 34. The spring 30 resists movement of the plate 18 downwardly toward plate 20 and opposes therefore actuation of the blade 36 by the finger.

The cover 14 is secured to the body 10 of the washing machine within the opening 12 by means of hinge 40 having one plate 42 secured to the outer surface of the flange 24 and the other hinge plate 44 connected to the flange 46 of the body, which defines the opening 12.

The control panel 16 of the washing machine extends upwardly from the rear of the upper surface of the machine and carries the timer and controls diagrammatically represented at 48. Instrument panel 16 also bears an indicator 50 which may be in the form of a light, alarm, or some similar device. This device is electrically connected about the hinge 40 to the switch 34 within the cover 14. The switch 34 and indicator 50 are connected to a power supply and when the switch 34 is actuated by finger 38 the indicator is energized and rendered operative. Thus, when the load applied to the weighing platform 18 exceeds the weight required to cause the finger 38 to actuate the blade 36, the indicator 50 is energized to inform the operator that the contemplated washing load is excessive.

Figure 2:
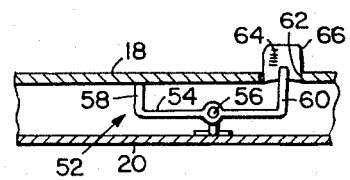
FIG. 2 is a detailed view of a part of the cover shown in FIG. 1.

While the indicator 50 and switch 34 serve as an "on-off" type of device to represent that the load applied to the upper surface of the cover is less or more than some prescribed weight, a separate indicating device shown in FIG. 2 renders an actual measurement of the weight applied to the plate 18. In FIG. 2, it will be seen that the indicator 52 includes a generally U-shaped lever 54 pivotally supported intermediate its ends on fulcrum 56 in the form of a pin which extends through an opening in the lever. The pin 56 is mounted on the plate 20 and therefore will not move in response to movement of the upper plate or weighing platform 18. One arm 58 of lever 54 engages the lower surface of the plate 18 while the other arm 60 extends through an opening 62 formed in the upper plate and is adapted to move adjacent a series of graduations 64 formed in the upstanding tab 66 which forms part of the plate 18. It will be recognized that when the plate 18 moves downwardly toward plate 20, the arm 58 of lever 54 also moves downwardly causing the arm 60 to rise through opening 62 and move adjacent the graduations 64. By calibrating the graduations with respect to the anticipated displacement of the platform on plate 18 per unit load applied to it, it will be recognized that the arm 60 and calibrations 64 may render a rather accurate measurement of the weight applied to the plate 18.

Figure 3:
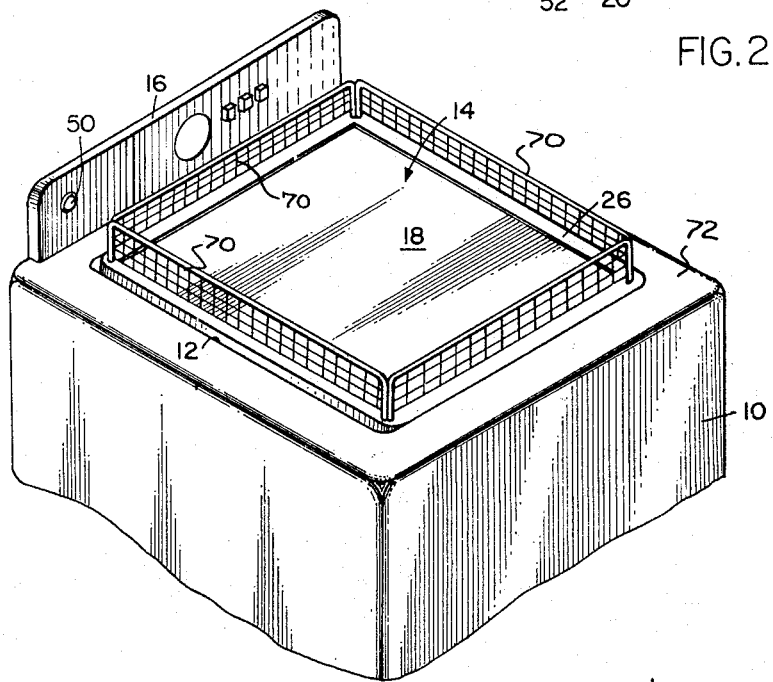
FIG. 3 is a perspective view of the top of a washing machine constructed in accordance with my invention.

In FIG. 3 a number of wicker-type wire walls 70 are shown pivotally secured about the periphery of the upper plate 18. The walls 70 lie on the four sides of the plate 18 and form with the plate 18 a basket for retaining the articles to be weighed within the confines of the surface of the plate. Thus, the wire walls prevent the articles to be weighed from falling on to the upper surface of the fixed top wall 72 of the machine and thereby escape being weighed. The walls may be hingedly secured in place so that they are foldable out of the way when the scale is not in use.

The spring 30 selected for use in the weighing device is adapted to yield to a load applied to the plate 18 a distance which just allows the finger 38 to actuate the blade 36 when the maximum allowable load is exceeded. Thus, when the proposed load to be washed is placed on the platform 18 by the operator, if it does not exceed the allowable limit of the machine as determined by the manufacturer, the indicator 50 will not be energized and the operator will be apprised of the fact that the load is below the acceptable maximum. By means of the scale 52, the user may also quickly learn the exact weight of the proposed load.

From the foregoing description it will be appreciated that my invention may be manufactured as original equipment in washing machines or the cover may be separately manufactured and sized to fit machines of different manufacturers. Substantially, the entire weighing device is incorporated into the cover itself and therefore is not dependent upon any particular characteristics of the machine body. The simple connection about the hinge to the indicator may be made if desired when the cover is installed either as original equipment or as a replacement, or alternatively, the indicator 50 could be contained as part of the cover and be energized by a low voltage system such as a dry cell.

Because numerous modifications may be made of my invention without departing from its spirit, I do not intend to limit the breadth of my invention to the specific embodiment illustrated and described. Typical variations which do not constitute a departure from my invention are to incorporate the electrical connection between the indicator 50 and switching device 34 directly into the hinge, and to mount the walls 70 directly on the plate 18 rather than on the narrow flange 26. Also, it is of course important that the upper plate 18 remain parallel to the lower plate. This may be accomplished either by registration of the vertical walls 24 and 26, or by extending the collar 32 into the wall 30 in sliding contact therewith. Therefore, it is my intention that the breadth of this invention be determined by the appended claims and their equivalents.

What is claimed is:

1. A cover for a top loading washer comprising a base plate adapted to be hinged to the body of the washer, a top plate disposed generally parallel to the base plate and movable toward and away from the base plate, biasing means urging the top plate to a selected position above the base plate, a switching device mounted on the base plate and adapted to be actuated by the top plate in response to movement of the top plate towards the base plate, and signaling means operatively connected to the switching device and rendered operative in response to actuation of said device.

2. A cover as defined in claim 1 further characterized by basket defining means pivotally secured to one of said plates and adapted to be positioned to form a basket with said top plate for retaining articles on said top plate.

3. A cover as defined in claim 1 further characterized by said biasing means including a spring disposed between said plates for elevating said top plate above the base plate.

4. In a washing machine having a body and an opening in the top of the body through which articles to be washed are placed in the body; a cover for the opening comprising a base plate adapted to be hinged to the body of the washer, a top plate disposed generally parallel to the base plate and moveable toward and away from the base plate, biasing means urging the top plate to a selected position above the base plate, means mounted on the base plate and adapted to be actuated by the top plate in response to movement of the top plate toward the base plate, and indicating means operatively connected to the last named means and operative in response to actuation of said last named means.

References Cited in the file of this patent

UNITED STATES PATENTS

| | | |
|---|---|---|
| 2,069,499 | Marin et al. | Feb. 2, 1937 |
| 2,412,270 | Johnston | Dec. 10, 1946 |
| 2,554,672 | Johnston | May 29, 1951 |
| 2,656,236 | Wasemann | Oct. 20, 1953 |
| 2,685,441 | Baade | Aug. 3, 1954 |